United States Patent
Ruhdorfer

(10) Patent No.: US 8,025,978 B2
(45) Date of Patent: Sep. 27, 2011

(54) MULTILAYERED BOARD

(75) Inventor: Herbert Ruhdorfer, Salzburg (AT)

(73) Assignee: KAINDL FLOORING GmbH, Wals (AT)

( * ) Notice: Subject to any disclaimer, the term of this patent is extended or adjusted under 35 U.S.C. 154(b) by 606 days.

(21) Appl. No.: 11/815,199

(22) PCT Filed: May 8, 2006

(86) PCT No.: PCT/EP2006/004287
§ 371 (c)(1),
(2), (4) Date: Jul. 31, 2007

(87) PCT Pub. No.: WO2006/119950
PCT Pub. Date: Nov. 16, 2006

(65) Prior Publication Data
US 2008/0199672 A1    Aug. 21, 2008

(30) Foreign Application Priority Data
May 9, 2005  (DE) .................. 10 2005 021 156

(51) Int. Cl.
*B32B 5/66* (2006.01)
(52) U.S. Cl. .................. 428/532; 428/537.5; 427/326; 427/391; 427/411; 427/415
(58) Field of Classification Search .................. 428/532, 428/537.5; 427/326, 391, 411, 415
See application file for complete search history.

(56) References Cited

U.S. PATENT DOCUMENTS

| | | | |
|---|---|---|---|
| 2,964,426 A | | 12/1960 | Holtschmidt |
| 4,244,990 A | | 1/1981 | Mayerhoffer |
| 4,246,315 A | | 1/1981 | Kopp et al. |
| 4,552,792 A | * | 11/1985 | Julian et al. .................. 428/42.2 |
| 5,702,806 A | * | 12/1997 | O'Dell et al. .................. 428/206 |
| 6,325,884 B1 | | 12/2001 | Karam |
| 6,485,823 B2 | | 11/2002 | Karam |
| 2007/0196676 A1 | | 8/2007 | Schuster |

FOREIGN PATENT DOCUMENTS

| | | | |
|---|---|---|---|
| DE | 1053303 | | 3/1959 |
| DE | 2901396 | | 7/1970 |
| DE | 2335859 | | 1/1975 |
| DE | 28 01 396 | | 7/1979 |
| DE | 2917170 | | 11/1979 |
| DE | 3403691 | | 4/1985 |
| DE | 3630315 | | 3/1988 |
| GB | 2020199 | | 11/1979 |
| WO | 88/01575 | | 3/1988 |
| WO | 00/41883 | | 7/2000 |
| WO | WO00/41883 | * | 7/2000 |
| WO | 00/61385 | | 10/2000 |
| WO | WO00/62385 | * | 10/2000 |
| WO | 2006/000253 | | 1/2006 |
| WO | WO2006/000253 | * | 1/2009 |

* cited by examiner

*Primary Examiner* — Leszek Kiliman
(74) *Attorney, Agent, or Firm* — Greenblum and Bernstein P.L.C.

(57) ABSTRACT

A multilayered board including a material board having a visible surface coated with at least one paper layer impregnated with resin. The multilayered board includes a material board, at least one paper layer structured to coat the material board, and a resin layer structured to impregnate the at least one paper layer, wherein the resin layer is arranged to face away from the material board and have an average layer thickness of at least 5 μm.

20 Claims, 1 Drawing Sheet

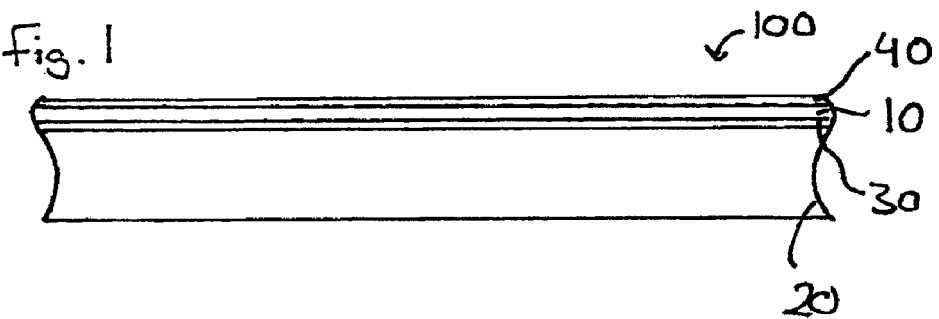
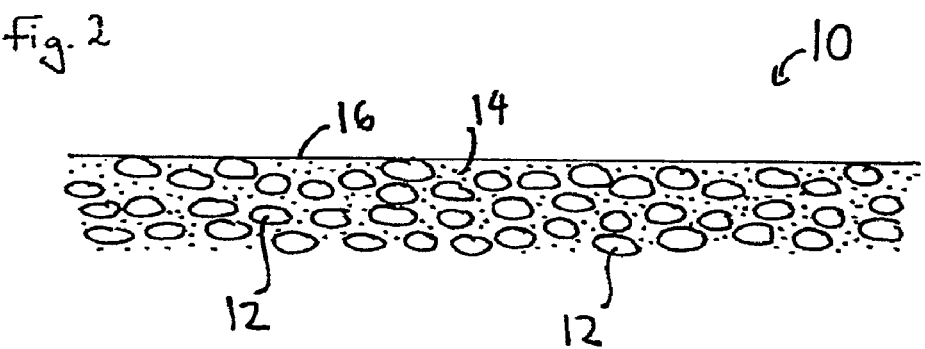
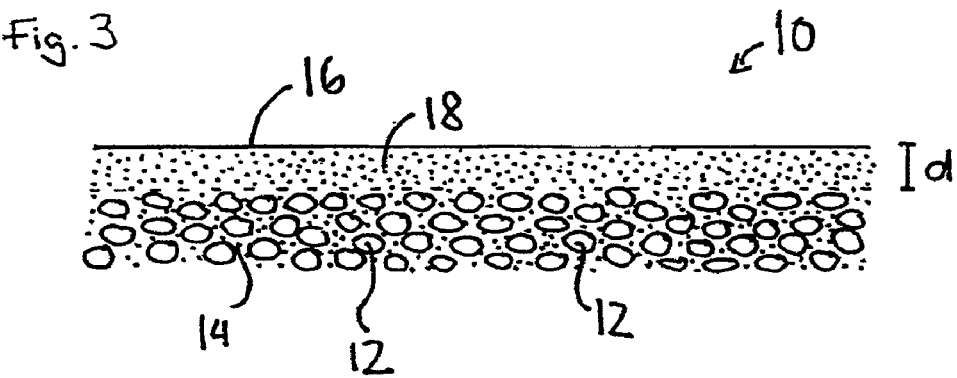

US 8,025,978 B2

MULTILAYERED BOARD

CROSS-REFERENCE TO RELATED APPLICATIONS

The present application is a U.S. National Stage of International Patent Application No. PCT/EP2006/004287 filed May 8, 2006, and claims priority under 35 U.S.C. §119 and §365 of German Patent Application No. 10 2005 021 156.9 filed May 9, 2005.

BACKGROUND OF THE INVENTION

1. Field of the Invention

The invention relates to a multilayered board comprising a material board and, in particular, a multilayered board having a visible surface coated with at least one paper layer impregnated with resin.

2. Discussion of Background Information

It is known to coat wood-based materials such as chipboards, fiberboards, e.g., MDF boards (Medium-Density Fiberboard) or HDF boards (High-Density Fiberboard) or OSB boards (Oriented Structural Board) with decorative papers that are preferably impregnated with aminoplastic resins. Furthermore, it is known to coat continuous pressure laminates (CPL), which: are formed by stacking several paper layers, with decorative papers that are preferably impregnated with aminoplastic resins. As a rule, the decorative papers used for this have a weight per unit area of 45 to 140 g/m². Usually the resins used for impregnating the paper webs are polycondensation products of melamine with formaldehyde. However, polycondensation products are also used which have a mixed polycondensation of urea and/or melamine with formaldehyde.

In the production of the paper impregnated with resin, the base papers are impregnated with the above-mentioned resins in special impregnation installations. Subsequently decorative papers impregnated in this manner and cut to size are laid on one side or on both sides of material boards and pressed in multi-stage presses, short-cycle presses, or continuous presses (feed-through presses) to form a decorative product, which is then marketed, e.g., as a decorative board, countertop, or flooring element.

To obtain a desired surface structure of the decorative products or the decorative papers, chromium-plated pressing plates are mostly used in the presses, wherein the pressing plates are embodied with corresponding surface structures. A "structure" thereby means not only relief structures, such as a wood structure or a stone structure, but also gloss structures, such as high gloss, pearl gloss, or matt gloss.

An optically high-gloss surface is thereby defined according to the standards DIN 67530, ISO 2813, ASTM D 523 and BS 3900 Part D5 such that the surface has a value of more than 60 gloss units at an angle of incidence of 20° with respect to the surface plane. Surfaces that have a value of 10 to 70 gloss units at an angle of incidence of 60° with respect to the surface plane are called medium-gloss surfaces, while matt-gloss surfaces have fewer than 10 gloss units at an angle of incidence of 60°.

While optically matt-gloss surfaces can be obtained with all of the above-mentioned press types, the production of optically high-gloss surfaces has hitherto been possible only in multi-stage presses with subsequent re-cooling.

However, due to the necessary re-cooling phase, the use of multi-stage presses to produce multilayered boards with high-gloss surfaces has the disadvantages of a high energy consumption and a long production period, since the entire press cycle lasts 15 to 25 minutes. On the other hand, with a short-cycle pressing process, the press cycle lasts only 10 to 30 s, and in the continuous manufacturing process a press cycle actually lasts only 5 to 10 s.

SUMMARY OF THE INVENTION

An aspect of the present invention is therefore to provide a multilayered board that can also be produced with a high-gloss surface on short-cycle installations and in continuous installations.

This aspect is achieved according to the invention through a generic multilayered board in which a resin layer is present on the side of the at least one paper layer or the topmost paper layer facing away from the material board, the average layer thickness of the resin layer is at least 5 µm. The resin layer according to the claims makes it possible to produce high-gloss surfaces according to the above definition in the short-cycle method and on feed-through presses as well, since an average layer thickness of at least 5 µm prevents paper fibers from projecting up to the surface of the decorative paper, thus impairing the reflection features of the surface.

The resin layer is hereby preferably a layer embodied essentially continuously, the layer thickness of which is at least 2 µm at every point, preferably at least 3 µm. This ensures that the resin layer is not so thin at any point that individual paper fibers can still protrude up to the surface of the paper layer at some points, despite the average layer thickness of at least 5 µm.

The layer thickness can be, e.g., no more than 100 µm, preferably no more than 50 µm, and even more preferably no more than 20 µm, since greater layer thicknesses are associated only with an increased resin consumption, but no further improvement of the surface properties, in particular the surface gloss, is achieved.

With the multilayered board according to the invention the at least one paper layer can also comprise a visible paper layer, preferably a decorative paper layer.

The visible paper layer used in the production of the multilayered board preferably has a base paper smoothness of at least 20 s, preferably at least 25 s, measured according to the Bekk Method. Through this, high base paper smoothness it is possible to ensure that the quantity of resin applied sinks into the paper far less than with papers that are not as smooth, whereby the resin layer according to the invention can be achieved with a relatively small quantity of resin. The visible paper layer can have, e.g., a weight per unit area of between approximately 45 g/m² and approximately 140 g/m².

Furthermore, at least one backing paper layer can be arranged between the material board and the visible paper layer, which backing paper layer serves as a further barrier to prevent the resin sinking in. Alternatively or additionally, an overlay paper layer can be provided on the side of the visible paper layer facing away from the material board, wherein the overlay paper layer serves mainly to increase the wear-resistance of the multilayered board. This overlay paper layer preferably has a weight per unit area of between approximately 10 g/m² and approximately 80 g/m². The overlay paper layer becomes essentially transparent due to the impregnation with resin, so that it does not really interfere with the view of the visible paper layer, which is preferably embodied as a decorative paper layer.

The resin used is preferably a polycondensation product of melamine and/or urea with formaldehyde.

The material board is preferably a wood-material board, e.g., a chipboard or a fiberboard, preferably an MDF board, an HDF board, or an OSB board. Alternatively, the material board can be a continuous-pressure laminate board (CPL board) formed by stacking several paper layers.

BRIEF DESCRIPTION OF THE DRAWINGS

Further properties, features and advantages of the present invention are shown by the following detailed description together with the attached drawings, which explain one embodiment of the invention in more detail purely by way of example. They show:

FIG. 1: A roughly diagrammatic sectional representation to explain the basic structure of a multilayered board according to the invention;

FIG. 2 A diagrammatic representation of a cross section through the surface area of a visible paper layer impregnated with resin for a conventional multilayered board without an overlay paper layer; and FIG. 3: A diagrammatic representation of the cross section through the surface area of a visible paper layer for a multilayered board according to the invention without an overlay paper layer.

DETAILED DESCRIPTION OF THE PRESENT INVENTION

FIG. 1 shows the structure of a multilayered board 100 in diagrammatic form. A material board 20, which comprises either a wood-material board, e.g., a chipboard or a fiberboard, preferably an MDF board or an HDF board, or an OSB board, or a high-pressure laminate board formed by stacking several paper layers, is hereby coated with a visible paper layer 10 impregnated with resin.

In addition, a backing paper layer 30 can be arranged between the material board 20 and the visible paper layer 10, wherein the backing paper layer prevents the resin sinking out of the visible paper layer 10. Furthermore, to increase the wear-resistance of the multilayered board 100, an overlay paper layer 40 can be provided on the side of the visible paper layer 10 facing away from the material board 20. The overlay paper layer 40 can have a relatively low weight per unit area of between 10 and 80 g/m² and is therefore essentially transparent when impregnated with resin. This basic structure of the multilayered board 100 according to the invention corresponds to that of a conventional multilayered board.

FIG. 2 shows a conventional visible paper layer 10 impregnated with resin, in which a paper layer on a material board 20 is coated in a structure shown in FIG. 1 (without an overlay paper layer 40), and which further comprises a mixture of paper fibers 12 and the impregnating resin 14 surrounding the paper fibers 12. It is apparent here that some paper fibers 12 reach up to the visible surface 16 of the paper layer 10, so that these projecting paper fibers 12 can form surface roughnesses on the visible surface 16 of the paper layer. These roughnesses scatter the incident light, thus impairing the gloss properties of the visible surface 16.

In contrast, the visible paper layer 10 according to the invention shown in FIG. 3 has a resin layer 18 projecting above the paper fibers 12, wherein the resin layer ideally has a uniform thickness d of at least 5 μm. This resin layer 18 that projects above the paper fibers 12 prevents individual paper fibers 12 from protruding up to the visible surface 16 of the paper layer 10, which is impregnated with resin Therefore, a paper layer 10 impregnated with resin allows for a smooth, reflective, and high-gloss visible surface 16 to be provided.

In order to achieve a projecting resin layer 18 of this type, either sufficient resin, depending on the weight per unit area of the paper used and the operating parameters of the press used, can be applied. It can also be ensured that the applied resin sinks as little as possible into the paper 10 or even further into the material board 20 lying underneath, by either compacting the paper fibers 12 near the visible surface 16 by increasing the base paper smoothness or by using at least one backing paper layer 30 between the material board 20 and the decorative paper layer 10. In this regard, backing paper layer 30 prevents resin from sinking into the material board 20.

Several examples are provided below for increasing the gloss properties of decorative paper surfaces 16 for multilayered boards 100 according to the invention:

EXAMPLE 1

Increasing the base paper smoothness. In the case of a decorative paper with white decoration, the base paper smoothness, measured according to Bekk, was increased from 17 s to 28 s. A decorative paper treated in this manner, and a decorative paper on which no additional smoothing has been carried out, were impregnated with the same resin bath, whereby the same melamine resin quantity was applied in each case based on the square meter. Since the resin sinks into the paper far less because of the increase in paper surface smoothness, a distinct improvement in the degree of gloss occurs with the decorative paper having a base paper smoothness increased to 28 s during the subsequent short-cycle high-gloss pressing of the two decorative papers that were prepared differently. At an angle of incidence of 20° to the paper surface, the decorative paper with no additional smoothing has a value of 28 gloss units and the decorative paper with the additional smoothing has a value of 79 gloss units.

EXAMPLE 2

Increasing the quantity of resin. With a white decorative paper the quantity of resin applied was increased by 30% compared to the standard quantity of resin applied based on the base paper weight. More resin is therefore available during the subsequent pressing on a continuous press and therefore a projecting resin layer forms above the paper fibers.

The decorative paper with the standard resin application achieved a value of 28 gloss units in the measurement of the degree of gloss at an angle of incidence of 20°. In comparison, the decorative paper with a quantity of resin increased by 30% applied to it achieved a value of 62 gloss units.

EXAMPLE 3

Different quantities of resin. Different decorative papers (white, ivory and wood pattern) were impregnated with the same resin formula, but different quantities of resin. The ivory decorative paper was hereby impregnated in a standard manner, the wood-pattern decorative paper was impregnated such that pure impregnating resin is discernible as projecting in places. The white decorative paper was impregnated such that an average layer thickness of at least 5 μm is present before pressing a continuous projecting layer of impregnating resin. These impregnated decorative papers were pressed in a short-cycle press and in a continuous press, respectively, against high-gloss sheets or high-gloss belts. The results of the gloss measurement are as follows:

|  | Short-Cycle Press | Continuous Press |
| --- | --- | --- |
| Ivory decorative paper (standard) | 26 gloss units | 22 gloss units |
| Wood-pattern decorative paper (slightly increased application of resin) | 58 gloss units | 48 gloss units |
| White decorative paper (continuous layer of impregnating resin) | 84 gloss units | 74 gloss units |

As shown in the above examples, high-gloss surfaces 16 can thus be achieved with decorative papers 10 for coating material boards 20 either by increasing the base paper smoothness of the paper to be impregnated before impregnation, or by increasing the quantity of resin applied compared to the standard parameters. Both of these measures produce the formation of a projecting resin layer 18 above the paper fibers 12 of the visible paper layer 10.

The invention claimed is:

1. A multilayered board comprising:
a material board;
at least one paper layer provided on the material board;
a resin layer formed on a surface of the at least one paper layer opposite the material board having an average layer thickness of at least 5 μm,
wherein the at least one paper layer further comprises a visible paper layer, and the visible paper layer has a base paper smoothness measured according to Bekk of at least 20 s.

2. The multilayered board of claim 1, wherein the resin layer comprises a resin impregnating the at least one paper layer.

3. The multilayered board of claim 1, wherein the at least one paper layer is a topmost paper layer on the material board.

4. The multilayered board of claim 1, wherein the resin layer is essentially continuously formed, and a layer thickness of the resin layer is at least 2 μm.

5. The multilayered board of claim 1, wherein the resin layer is essentially continuously formed, and a thickness of the resin layer is at least 3 μm.

6. The multilayered board of claim 1, wherein a layer thickness of the resin is no more than 100 μm.

7. The multilayered board of claim 1, wherein a layer thickness of the resin is no more than 50 μm.

8. The multilayered board of claim 1, wherein a layer thickness of the resin is no more than 20 μm.

9. The multilayered board of claim 1, wherein the visible paper layer is a decorative paper layer.

10. The multilayered board of claim 1, wherein the visible paper layer has a base paper smoothness measured according to Bekk of at least 25 s.

11. The multilayered board of claim 1, further comprising at least one backing paper layer arranged between the material board and the visible paper layer.

12. The multilayered board of claim 1, wherein the at least one paper layer further comprises an overlay paper layer arranged on a side of the visible paper layer opposite the material board.

13. The multilayered board of claim 12, wherein the overlay paper layer has a weight per unit area between approximately 10 g/m2 and approximately 80 g/m2.

14. The multilayered board of claim 1, wherein the visible paper layer has a weight per unit area between approximately 45 g/m2 and approximately 140 g/m2.

15. The multilayered board of claim 2, wherein the resin comprises one or more of a polycondensate of melamine and a urea with formaldehyde.

16. The multilayered board of claim 1, wherein the material board comprises a wood-material board.

17. The multilayered board of claim 16, wherein the material board comprises a chipboard, a fiberboard, a Medium-Density Fiberboard (MDF) board, a High-Density Fiberboard (HDF) board, or an Oriented Structural Board (OSB) board.

18. The multilayered board of claim 1, wherein the material board comprises a high-pressure laminate formed by several stacked paper layers.

19. A method for forming a multilayered board, comprising:
covering a material board with at least one paper layer comprising a visible paper layer having a base paper smoothness measured according to Bekk of at least 20 s; and
forming a resin layer having an average thickness of at least 5 μm above the visible paper layer of the at least one paper layer opposite the material board.

20. The method of claim 19, further comprising at least one of: increasing a base paper smoothness of the at least one paper layer before forming the resin layer or positioning a backing layer between the at least one paper layer and the material board to prevent the resin from sinking into the material board.

* * * * *